United States Patent [19]
Yeung et al.

[11] Patent Number: 5,642,657
[45] Date of Patent: Jul. 1, 1997

[54] TOASTER WITH COVER FOR REDUCED ENERGY CONSUMPTION

[75] Inventors: Pat Hok-Kwong Yeung; Miu-Choy Yeung; Eric Wah Ho, all of Hong Kong, Hong Kong

[73] Assignee: SEMK Industrial (Holding) Co. Ltd., Hong Kong

[21] Appl. No.: 527,349

[22] Filed: Sep. 12, 1995

[51] Int. Cl.[6] .................................................. A47J 37/08
[52] U.S. Cl. .................. 99/334; 99/385; 99/391; 99/393
[58] Field of Search .................. 99/329 R, 331, 99/332, 395, 326–328, 329 P, 329 RT, 334, 335, 339, 337, 340, 385, 389–393, 399, 401, 402; 219/521, 537, 386, 413

[56] References Cited

U.S. PATENT DOCUMENTS

| | | | |
|---|---|---|---|
| 2,997,941 | 8/1961 | Phelan et al. | 99/391 |
| 3,760,713 | 9/1973 | Sato | 99/339 |
| 3,789,749 | 2/1974 | Paaskesen | 99/391 |
| 4,254,695 | 3/1981 | Landry | 99/334 |
| 4,397,227 | 8/1983 | Landry | 99/337 |
| 4,404,899 | 9/1983 | Weiss | 99/332 |
| 4,972,768 | 11/1990 | Basora San Juan | 99/391 |
| 5,181,455 | 1/1993 | Masel et al. | 219/521 |
| 5,216,944 | 6/1993 | Trujillo | 99/385 |
| 5,423,246 | 6/1995 | McNair et al. | 99/334 |

FOREIGN PATENT DOCUMENTS

| | | | |
|---|---|---|---|
| 3045598 | 7/1982 | Germany | 99/391 |
| 2285389 | 7/1995 | United Kingdom | A47J 37/08 |

Primary Examiner—Timothy F. Simone
Attorney, Agent, or Firm—Limbach & Limbach L.L.P.

[57] ABSTRACT

A toaster having a mechanically actuated cover for each of one or more toasting volumes. Each cover at least partially covers a toasting volume within the toaster during toasting, thereby reducing heat transfer (primarily due to convection) away from the toaster and the object being toasted. In preferred embodiments, each cover is a pair of slidably mounted plates. When a carriage (supporting an object to be toasted) is manually lowered by a user, a mechanical linkage attached to the carriage cause the plates to slide together to cover (substantially or totally) a toasting volume. When the carriage springs up (at the end of the toasting operation), the mechanical linkage slides the plates away from each other to allow removal of the toasted object from the toaster. In other preferred embodiments, each cover is a pair of rotatably mounted plates. When a carriage supporting an object is manually lowered by the user, a mechanical linkage attached to the carriage rotates (and optionally also translates) the plates so that they cover a toasting volume. Then, when the carriage springs up (at the end of the toasting operation), the mechanical linkage rotates (or rotates and translates) the plates in the opposite direction to uncover the toasting volume and allow removal of the toasted object.

14 Claims, 7 Drawing Sheets

TOASTER WITH COVER FOR REDUCED ENERGY CONSUMPTION

FIELD OF THE INVENTION

The invention relates to improved energy-saving design for a toaster. The toaster of the invention has a mechanically actuated cover which is closed during toasting to reduce heat loss (primarily heat loss due to convection) away from the object being toasted, and which is opened automatically after each toasting operation, and/or kept closed until opened in response to manual actuation of a control (e.g., a cancellation button) to continuously recycle residual heat energy within the heating compartment of the toaster after each toasting operation.

BACKGROUND OF THE INVENTION

An example of a known toaster is the toaster described in British Patent Application Publication No. 2,285,389A, published on Jul. 12, 1995, assigned to the assignee of the present invention. The disclosure of British Patent Application Publication No. 2,285,389A is incorporated herein by reference.

The toaster of British Application Publication No. 2,285,389A has a bread carriage (15) which is biased by a spring (29) to be in a raised position, but which can be manually lowered into a lowered position (in response to manual force applied by a user). The action of manually lowering the bread carriage closes an electrical switch thereby connecting a power supply to heating elements within the toaster, and it also activates a solenoid (23) and a timer. When activated, the solenoid exerts a magnetic force on elements attached to bread carriage 15 which overcomes the biasing force of spring 29 and holds bread carriage in the lowered position (while the bread is toasted by the power-consuming heating elements).

After being activated at the start of a toasting operation, the timer generates a signal for deactivating the solenoid, at the end of a selected period of time (the duration of this time is determined by manual actuation of a control by a user). When the solenoid is deactivated by the signal from the timer, the carriage rises (in response to the biasing force exerted by spring 29) until an arm (18B) attached to the carriage is caught by a latch (24). In response to this limited movement of the carriage to an intermediate position (between the lowered and raised positions), the electrical switch opens (thereby disconnecting the power supply from the heating elements). While the carriage remains in the intermediate position (i.e., while arm 18B is latched by latch 24), the cooling of any toasted food resting on the carriage is slowed, since the food remains near the heating elements which themselves cool slowly after being disconnected from the power supply.

When a user wishes to remove the toasted food from the toaster, the user manually actuates another control to release latch 24, thereby releasing arm 18B and allowing the carriage to rise (in response to biasing force exerted by spring 29) from the intermediate position to the fully raised position.

During the toasting period (when power is supplied to the heating elements), the heating elements become hot and transfer heat to the air surrounding them. The heated air flows past the carriage and the food on the carriage, thus toasting the food. In a conventional toaster (which has an open slot above the food being toasted), a continuous stream of air flows through the toaster (from bottom to top) during toasting: cool air flows in through the bottom (and optionally also holes in the sides) of the toaster, the cool air is heated by the heating element, and the heated air then flows out through the slot above the food. Thus, much heat energy is wasted (by the mechanism of convective heat loss) due to the stream of hot air which escapes from the toasting volume.

The energy consumed by a toaster when toasting food is the product of the average power consumed by the toaster's heating elements and the time of the toasting operation. It would be desirable if the consumed energy could be reduced without decreasing the energy transferred to the food.

The present invention achieves this objective by reducing the energy wasted during a toasting operation by at least partially covering the toasting volume during toasting, thereby reducing the amount of heat transfer (primarily heat transfer due to convection) away from the toasting volume. This allows the inventive toaster to toast food either in less time, or with heating elements operating at a lower temperature (and thus drawing less power), than would be required in a conventional toaster.

SUMMARY OF THE INVENTION

The invention is a toaster having a mechanically actuated cover for each toasting volume within the toaster. Each cover at least partially (and preferably, substantially totally) covers a toasting volume during toasting, thereby reducing heat transfer away from the toaster and the object being toasted. In preferred embodiments, each cover is a pair of slidably mounted plates (which can but need not be made of metal or thermally insulating material). When the food lifting carriage is manually lowered by the user, a mechanical linkage attached to the carriage cause the plates to slide together to at least partially cover a toasting volume. Then, when the carriage springs up (at the end of the toasting operation), the mechanical linkage slides the plates away from each other to allow removal of the toasted object from the toaster. Alternatively, the mechanical linkage slides the plates away from each other in response to a user's manual actuation of a lever after a toasting operation; not automatically in response to the carriage springing up at the end of the operation.

In another class of preferred embodiments, each cover is a pair of rotatably mounted plates (which can but need not be made of metal or thermally insulating material). When the food lifting carriage is manually lowered by the user, a mechanical linkage attached to the carriage rotates (and optionally also translates) the plates so that they cover a toasting volume. Then, when the carriage springs up (at the end of the toasting operation), the mechanical linkage rotates (or rotates and translates) the plates in the opposite direction to uncover the toasting volume and allow removal of the toasted object. Alternatively, the mechanical linkage moves the plates away from each other in response to a user's manual actuation of a lever after a toasting operation; not automatically in response to the carriage springing up at the end of the operation.

The inventive cover can be made of metal or other high temperature resistant material. When closed, the cover acts as a barrier to the rising hot air within the toasting volume, causing the hot air to recirculate back to the heating elements and the food being toasted, and reducing the flow rate of incoming cool air through the bottom of the toaster, and the flow rate of hot air escaping out through the top of the toaster. In a given time, the heating elements can raise the recirculated hot air to a higher temperature than the temperature to which they could raise an equivalent amount of cool air freshly taken in through the bottom of the toaster. Thus, when used with the inventive closed cover, the heating coils cause the transfer of more heat to the food while drawing the same power as heating coils in a conventional toaster without a cover. Thus, food can be toasted to the same degree in less time, or in the same time but with less average power supplied to the heating elements, than in a conventional toaster. The inventive cover thus increases the energy efficiency of a toaster.

DETAILED DESCRIPTION OF THE PREFERRED EMBODIMENT

A toaster designed in accord with a preferred embodiment of the invention will be described with reference to FIGS. 1–6. This embodiment has a cover consisting of slidably mounted metal plates 14 and 15. When bread carriage 8 is manually lowered by a user (into the position shown in FIG. 2), a mechanical linkage attached to carriage 8 causes plates 14 and 15 to slide together to cover (at least partially) a toasting volume within the toaster. To toast an object (e.g., slice of bread 30 of FIGS. 1, 3, and 4, or slightly larger slice of bread 30' of FIG. 2) in the toasting volume, the object is placed on carriage 8, the carriage is lowered into a lowered position in which the object is within the toasting volume (e.g., the position shown in FIG. 2), and the carriage is releasibly latched into the lowered position.

Figure 1:
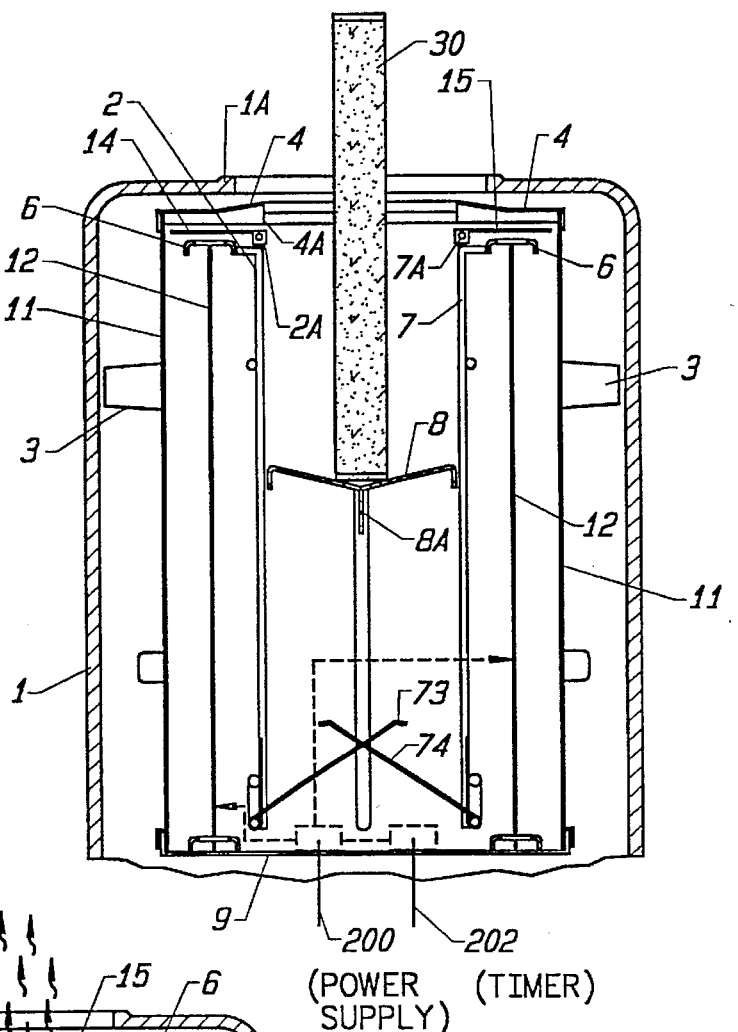
FIG. 1 is a cross-sectional view (in a first plane) of a first preferred embodiment of the inventive toaster with bread carriage 8 in a raised position.

As shown in FIGS. 1–4, the toaster has a chassis (or "frame") which includes vertically oriented insulation plates 11, horizontally oriented bottom plate 9 connected between plates 11, horizontally oriented top insulation member 4 connected between plates 11, end plates 13 (shown in FIGS. 5 and 6) oriented parallel to the plane of FIG. 1, and vertical rod 33 (shown in FIGS. 5 and 6) attached to one of end members 13. The frame is mounted within enclosure (or "housing") 1, and spacer members 3 are mounted between enclosure 1 and each plate 11 to stabilize the frame with respect to enclosure 1.

Carriage 8 within the frame is rigidly connected to a handle assembly, and the handle assembly is slidably mounted to rod 33 of the frame. The handle assembly comprises handle member 31 (rigidly connected to carriage 8) and a handle attached to an end portion of member 31 (a handle such as handle 32 shown in FIG. 7). In response to force exerted on handle 32 (typically by the hand of a human user), carriage 8 is lowered relative to the frame from the raised position shown in FIG. 1 (and FIG. 3) to the lowered position shown in FIG. 2 (and FIG. 4). Carriage 8 is biased by extension spring 29 (shown in FIGS. 5 and 6) so that it is normally in the raised position. The action of manually lowering carriage 8 to the lowered position thus overcomes the biasing force exerted by spring 29. The mechanism for releasibly locking carriage 8 in the lowered position will be described below.

An opening 1A extends through the top surface of enclosure 1, and opening 4A extends through member 4. An object to be toasted (e.g., bread slice 30 or 30') can be lowered through openings 1A and 4A until it rests on carriage 8.

When carriage 8 is manually lowered into the lowered position (of FIGS. 2, 4, and 5), a conventional electrical switch (not shown) is closed, thereby connecting a power supply (e.g., power supply 200 shown in phantom view in FIG. 1) to heating elements 12. Power supply 200 can have conventional design, but can be selected to be a less expensive (and less costly to operate) model that produces lower output power than would be required to enable a conventional toaster (without covers 14 and 15) to toast bread to the same degree in the same time as can the inventive toaster (with covers 14 and 15).

The power supply causes electrical current to flow through heating elements 12, which raises the temperature of elements 12, and thus the surrounding air in the toasting volume between elements 12, to a high temperature. The heated air toasts an object (e.g., bread slice 30 or 30') resting on carriage 8 in the toasting volume.

Mica holding elements 6 are mounted to the toaster frame, and heating elements 12 are mounted to holding elements 6 in a vertical orientation. Each heating element 12 can be a mica card having a heating ribbon on the side facing the bread (not on the other side), or an array of quartz tubes with a heating ribbon (e.g., a coiled heating wire) inside each tube and a metal plate attached to the side of the tube array facing the bread. One heating element 12 is mounted between wire assembly 2 and a first one of insulation plates 11, and the other heating element 12 is mounted between wire assembly 7 and a second one of insulation plates 11.

When carriage 8 is manually lowered into the lowered position (of FIGS. 2, 4, and 5), an electromagnetic solenoid (not shown) and a solid state timer (timer 202 shown in phantom view in FIG. 1) are activated. The solenoid (and also the timer, the above-mentioned power supply and electrical switch, and the below-described mechanical latch) can be identical to that described in above-referenced British Patent Application Publication No. 2,285,389A. When activated, the solenoid exerts a magnetic force on handle member 31 which overcomes the biasing force of spring 29 and holds carriage 8 in the lowered position (while an object is toasted by power-consuming heating elements 12). In variations on the embodiment of FIGS. 1–6, the activated solenoid exerts a magnetic force on an element (other than handle member 31) fixedly attached to carriage 8 which overcomes the biasing force of spring 29 and holds carriage 8 in the lowered position.

Each of cover plates 14 and 15 rests on a pair of horizontal edges of plates 13 of the toaster frame (each plate rests on two parallel, horizontal edges, each edge on a different one of plates 13), so that each plate has freedom to slide horizontally on the edges.

Figure 2:
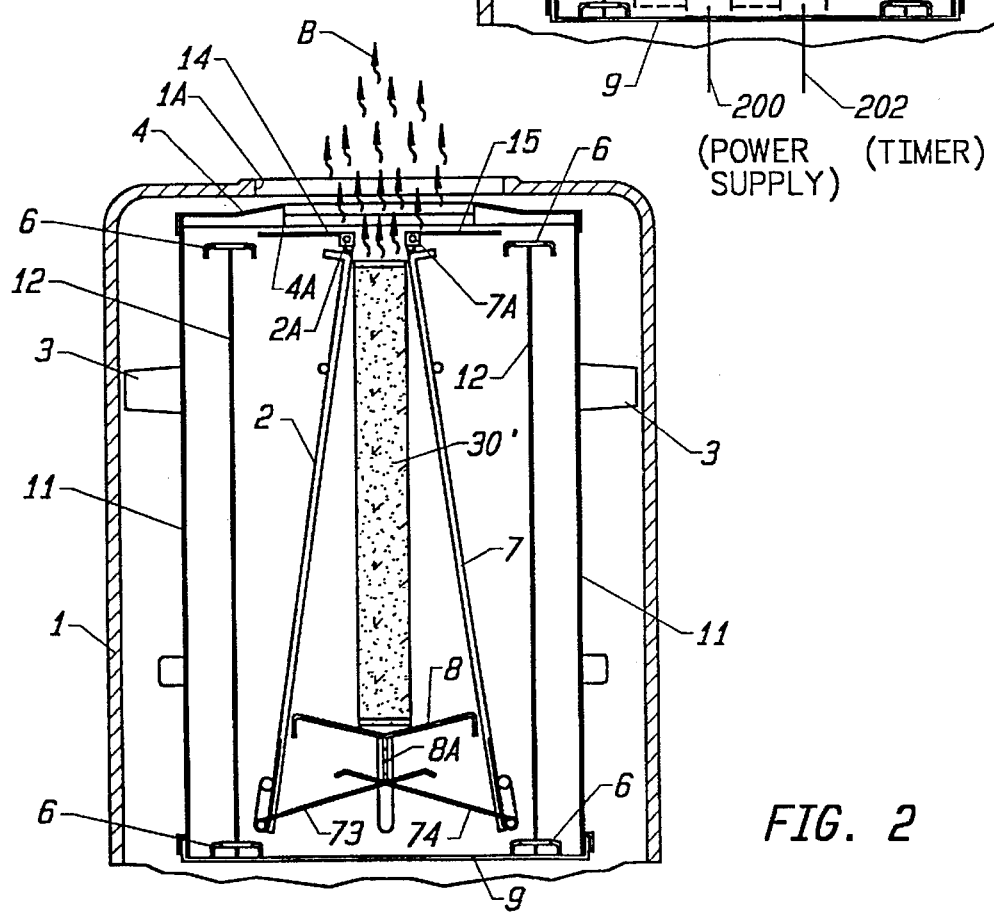
FIG. 2 is a cross-sectional view (in the first plane) of the first preferred embodiment of the inventive toaster, with bread carriage 8 in a lowered position.
Figure 3:
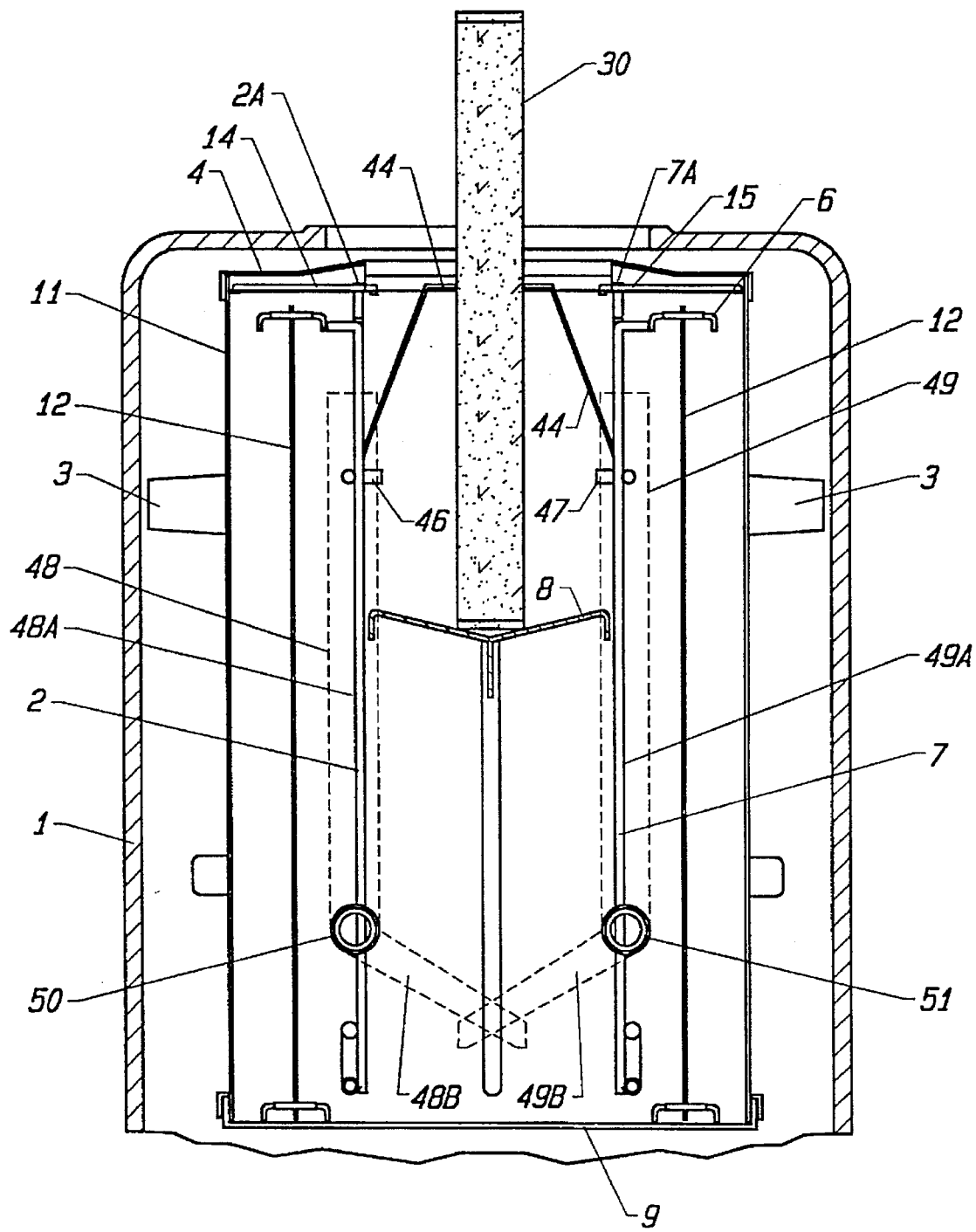
FIG. 3 is a cross-sectional view (in a second plane) of the first preferred embodiment of the inventive toaster with bread carriage 8 in the raised position.
Figure 4:
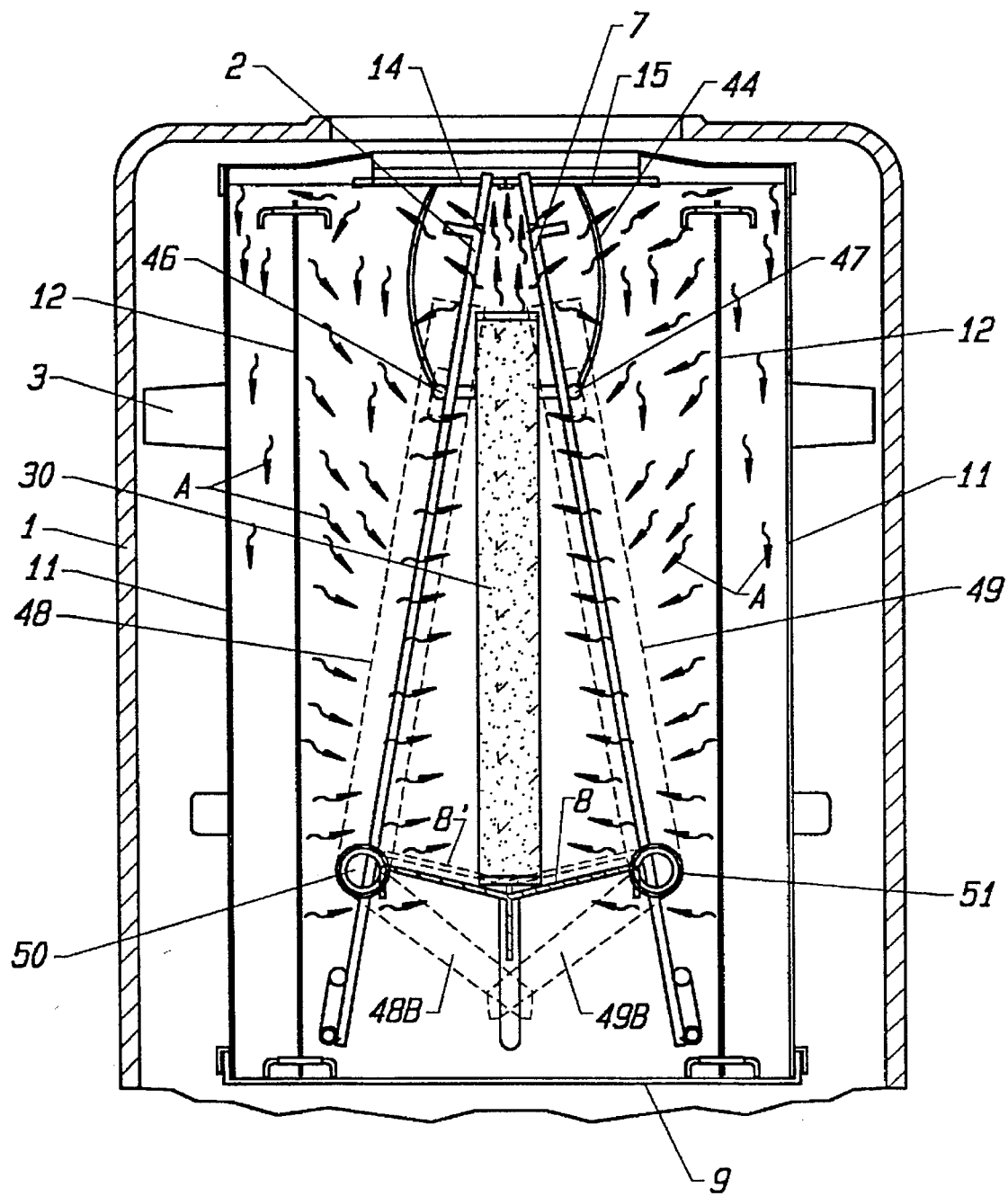
FIG. 4 is a cross-sectional view (in the second plane) of the first preferred embodiment of the inventive toaster, with bread carriage 8 in the lowered position.
Figure 5:
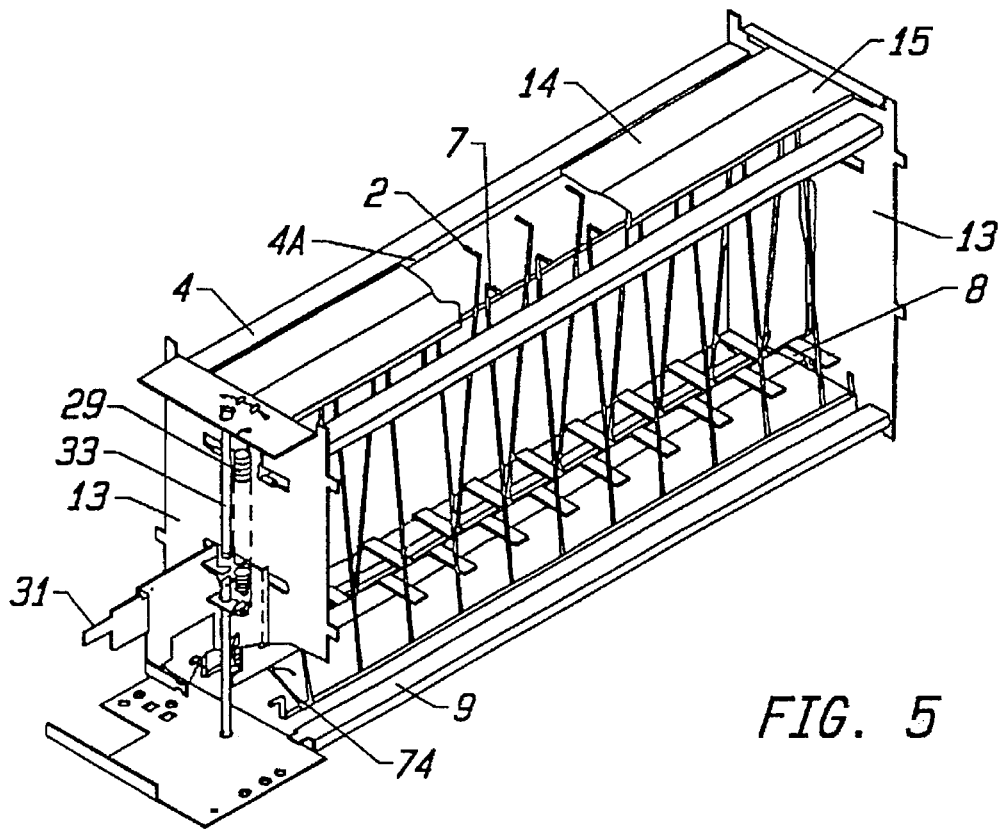
FIG. 5 is a perspective view of the toaster of FIGS. 1–4 (with enclosure 1, walls 11, and handle 32 removed), with carriage 8 in the lowered position.
Figure 6:
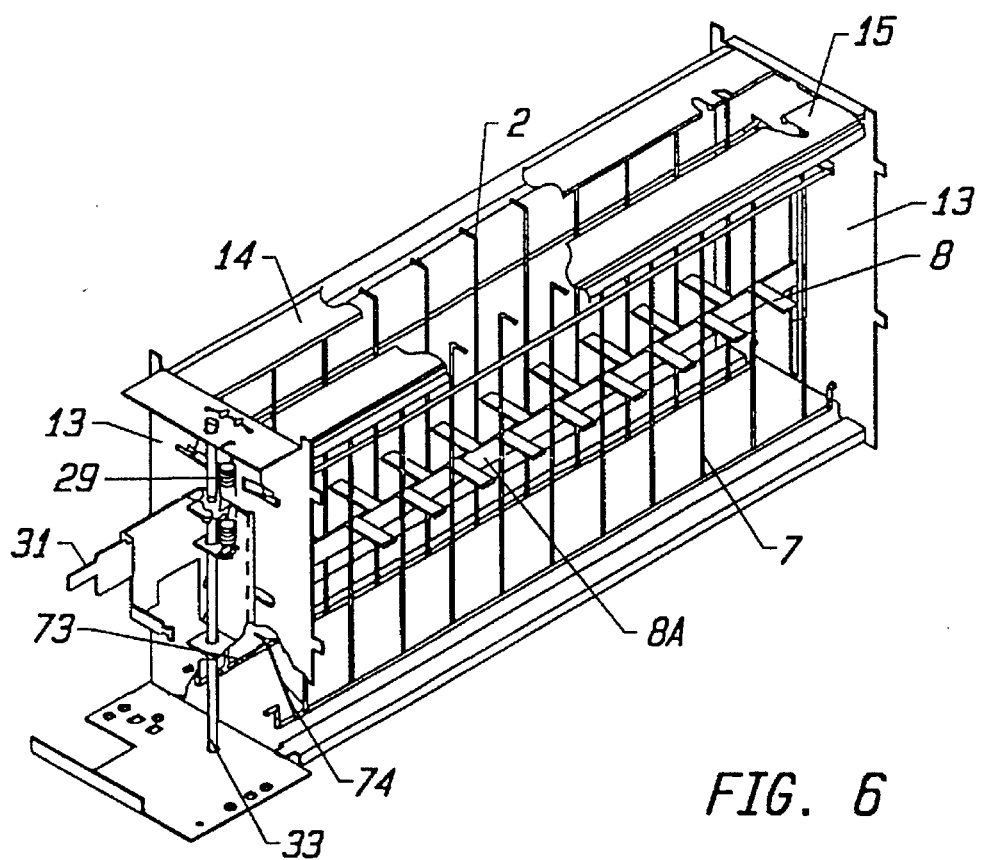
FIG. 6 is a perspective view of the toaster of FIGS. 1–4 (with enclosure 1, walls 11, and handle 32 removed), with carriage 8 in the raised position.

The mechanism for sliding plates 14 and 15 between their "opened" and "closed" positions includes wire rack assemblies 2 and 7, spring elements 73 and 74 (shown in FIGS. 1 and 2), levers 48 and 49 and hinges 50 and 51 (shown in FIGS. 3 and 4), and spring wire 44 (shown in FIGS. 3 and 4). Arm 48A of lever 48 is rigidly attached to wire assembly 2, and arm 49A of lever 49 is rigidly attached to wire assembly 7. Spring element 73 has one end fixedly attached to wire assembly 2, and spring element 74 has one end fixedly attached to wire assembly 7. Each of spring elements 73 and 74 also has a free end that is free to move relative to the toaster frame, and that is positioned to be engaged by central ridge portion 8A of carriage 8. Arm 48B of lever 48 and arm 49B of lever 49 are also positioned to be engaged by a member (e.g., handle member 31) rigidly connected to carriage 8.

Lever 48 is rigidly attached to hinge 50, and hinge 50 is rotatably attached to an end plate 13 of the toaster frame. Lever 49 is rigidly attached to hinge 51, and hinge 51 is rotatably attached to the same end plate 13 of the toaster frame.

While carriage 8 is manually lowered into the lowered position shown in FIG. 2 (and FIG. 4) in response to user-exerted force on the handle assembly comprising member 31 and handle 32, portion 8A of carriage 8 engages spring elements 73 and 74, forcing elements 73 and 74 to rotate (and slightly bend) into the position shown in FIG. 2. Also while carriage 8 is manually lowered into the lowered position, handle member 31 (rigidly connected to carriage 8) engages arm 48B of lever 48 and arm 49B of lever 49, forcing lever 48 to rotate clockwise about hinge 50 (from the position shown in FIG. 3 to that shown in FIG. 4), and forcing lever 49 to rotate counter-clockwise about hinge 51 (from the position shown in FIG. 3 to that shown in FIG. 4). When carriage 8 has been manually lowered into the lowered position (of FIGS. 2 and 4), it is held in the lowered position by the downward force exerted by the above-described solenoid.

As lever 48 and element 73 rotate clockwise (away from the positions shown in FIGS. 1 and 3) they exert a clockwise torque on wire assembly 2 and thus assembly 2 rotates clockwise (together as a unit with lever 48) from the position shown in FIGS. 1 and 3 to the position shown in FIG. 2 or 4. Similarly, as lever 49 and element 74 rotate counter-clockwise (away from the positions shown in FIGS. 1 and 3) they exert a counter-clockwise torque on wire assembly 7 and thus assembly 7 rotates counter-clockwise (together as a unit with lever 49) from the position shown in FIGS. 1 and 3 to the position shown in FIG. 2 or 4. As a result of such rotation of assemblies 2 and 7, bread slice 30 (or 30') on carriage 8 is firmly gripped between (or its motion is constrained by) assemblies 2 and 7, the upper end of a rod of assembly 2 (which upper end is rotatably attached to slidably mounted plate 14 by hinge 2A) pulls plate 14 to the right (from the position shown in FIG. 3 to that shown in FIG. 2 or 4), and the upper end of a rod of assembly 7 (which upper end is rotatably attached to slidably mounted plate 15 by hinge 7A) pulls plate 15 to the left (from the position shown in FIG. 3 to that shown in FIG. 2 or 4).

With a sufficiently thin slice of bread on carriage 8 (e.g., slice 30 shown in FIG. 4), the bread slice does not prevent assemblies 2 and 7 from pulling plates 14 and 15 together until they meet (as shown in FIG. 4). In their position shown in FIG. 4, plates 14 and 15 completely (or substantially completely) cover the toasting volume, and heated air within the toasting volume recirculates during toasting in the directions of arrows A of FIG. 4.

With a sufficiently thick slice of bread on carriage 8 (e.g., slice 30' of FIG. 2, which is thicker than slice 30 of FIG. 4), the bread slice will engage and stop assemblies 2 and 7 (as shown in FIG. 2) before assemblies 2 and 7 have pulled cover plates 14 and 15 completely together. In their position shown in FIG. 2, plates 14 and 15 partially cover the toasting volume. With plates 14 and 15 partially covering the toasting volume during toasting, some heated air in the toasting volume escapes out from the toaster between plates 14 and 15 (as shown by arrows B in FIG. 2), but much of the air heated by heating elements 12 recirculates within the toasting volume substantially as shown by arrows A of FIG. 4 (and thus energy efficiency of the toaster is improved relative to the efficiency that the FIG. 2 toaster would have with covers 14 and 15 omitted).

Wire spring 44 is provided for separating wire assemblies 2 and 7 (and thus cover plates 14 and 15) when carriage 8 returns to its fully raised position (shown in FIG. 3). The left end of spring 44 is attached to member 46 (which is in turn fixedly attached to a rod of wire assembly 2), the central portion of member 46 is fixedly attached to the toaster frame, and the right end of spring 44 is attached to member 47 (which is in turn fixedly attached to a rod of wire assembly 7). When carriage 8 is lowered, wire assembly 2 rotates clockwise and pushes member 46 toward member 47 and wire assembly 7 rotates counter-clockwise and pushes member 47 toward member 46 (e.g., from the position shown in FIG. 3 to that shown in FIG. 4), thus causing spring wire 44 to bend (as shown in FIG. 4). Then (after a toasting operation) when carriage 8 rises to its fully raised position (shown in FIG. 3), wire 44 relaxes back to its normal, unbent position (shown in FIG. 3), thereby separating members 46 and 47 (and thus returning wire assemblies 2 and 7 and levers 48 and 49 to their vertical orientation as shown in FIG. 3).

The toaster frame (elements 4, 9, 11, and 13) and cover plates 14 and 15 are preferably made of plated steel. Enclosure 1 is preferably made of plated or painted steel, or (to make the toaster cool to the touch during operation) high temperature thermal plastic such as polypropylene or polycarbonate.

In variations on the described toaster, spring elements 73 and 74 are omitted (or levers 48 and 49 and optionally also spring wire 44 are omitted).

In other variations on the described toaster, the solenoid is omitted, and instead a mechanical latch means holds an element rigidly attached to carriage 8 (such as member 31) to keep carriage 8 in the fully lowered position during a toasting period determined by the timer. At the end of the toasting period, the timer sends a control signal to electrical circuitry within the toaster to disconnect the power supply from heating elements 12. Then, when the user desires to remove the toasted food, the user manually actuates a control to release the mechanical latch, thus allowing spring 29 to pull up carriage 8 to the fully raised position (the upward movement of the carriage opens the cover over the toasting volume in the manner described above).

In some embodiments of the inventive toaster, the bread carriage is pulled up (by a spring such as spring 29) from its fully lowered position all the way to its fully raised position automatically in response to deactivation or release of the means (e.g., the above-discussed solenoid or mechanical latch) which had held it in the lowered position during a toasting operation.

In other embodiments, the toaster includes means for latching the bread carriage in an intermediate position (between the lowered and raised positions) in response to deactivation (or release) of the means which had held it in the lowered position during a toasting operation. An example of such an embodiment is that shown in FIGS. 7 and 8. This embodiment is almost identical to that of FIGS. 1–6 (and the elements of the embodiment of FIGS. 7 and 8 that correspond to those of the embodiment of FIGS. 1–6 are numbered identically in FIGS. 1–8). Only those elements of FIGS. 7 and 8 that have not been described above with reference to FIGS. 1–6 will be described below.

Figure 7:
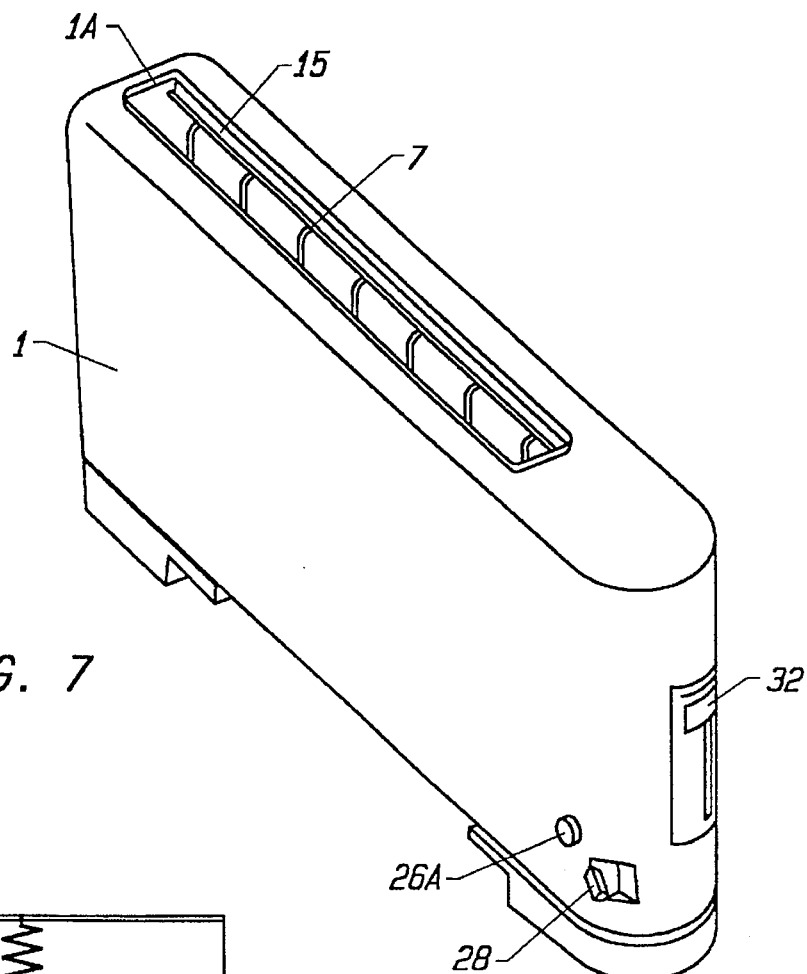
FIG. 7 is a perspective view of a variation on the toaster of FIGS. 1 and 3, with the bread carriage (within enclosure 1) and handle 32 (rigidly connected to the bread carriage) in their fully raised position.
Figure 8:
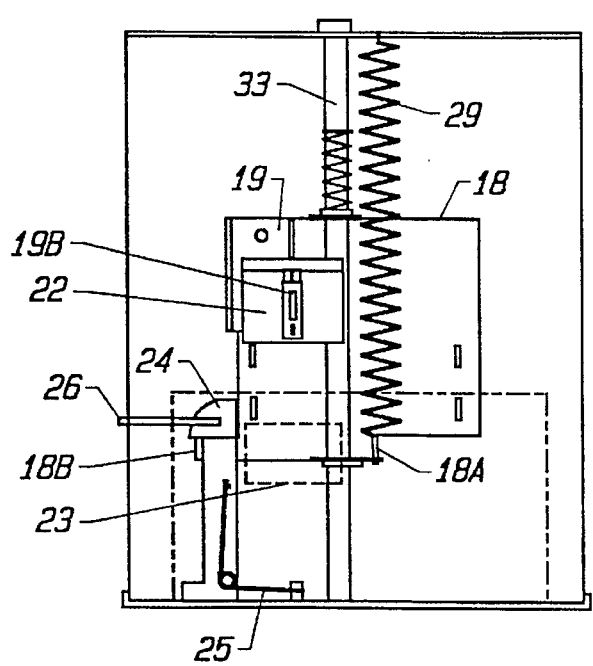
FIG. 8 is an end view of the toaster of FIG. 7 (with enclosure 1 and handle 32 removed), with the bread carriage latched (by latch 26) in its intermediate position.

With reference to FIGS. 7 and 8, carriage 8 within the frame (not shown in FIGS. 7 and 8) is rigidly connected to a handle assembly slidably mounted to rod 33 of the frame. The handle assembly comprises member 18 (rigidly connected to carriage 8), bracket 19 rigidly attached to member 18), and handle 32 (shown in FIG. 7) which is attached to protruding arm portion 19B of bracket 19. Extension spring 29 is mounted with its upper end attached to the toaster frame and its lower end attached to arm 18A of member 18 (so that spring 29 biases member 18 and the bread carriage attached thereto in their fully raised position). Latch 24 is hingedly attached to the toaster frame by elbow spring 25.

Conventional circuitry, including a power supply (for heating elements 12), a solenoid, and a timer, is housed in enclosure 1 in both the embodiments of FIGS. 1–6 and FIGS. 7–8. At the end of a selected period of time after the timer is activated (in response to closure of a switch by movement of the carriage assembly to its lowered position), the timer generates a signal which deactivates the solenoid (thus allowing the carriage to rise sufficiently far to open the switch, which in turn disconnects the power supply from the heating elements). The user selects the duration of the selected time period by manipulating knob 28.

Solenoid 23 is mounted to the toaster frame, and soft iron plate 22 is mounted to arm portion 19B of bracket 19. When a user manually lowers handle 32 (and bracket 19, plate 22, member 18, and carriage 8 rigidly attached to handle 32) into the fully lowered position, a switch (described above) activates solenoid 23, to cause solenoid 23 to exert a magnetic force on plate 22 thereby holding the entire carriage assembly (carriage 8, handle 32, bracket 19, plate 22, and member 18) in the fully lowered position.

At the end of a toasting operation, a timer (described above) deactivates solenoid 23 and decouples the toaster's heating elements from their power supply, allowing spring 29 to pull up the carriage assembly until arm 18B of member 18 is caught by latch 24. Latch 24 thus holds arm 18B (and the entire carriage assembly) in the intermediate position shown in FIG. 8.

One end of pin 26 is attached to the upper end of latch 24, and button 26A (shown in FIG. 7) is attached to the other end of pin 26. When a user presses button 26A, latch 24 pivots away from arm 18B, thereby releasing the carriage assembly so that spring 29 pulls the entire carriage assembly up to its fully raised position.

In the embodiment of FIGS. 7 and 8, the carriage assembly (including carriage 8) moves only a small distance from the fully lowered position to the intermediate position, and the cover (comprising plates 14 and 15) over the toasting volume remains closed even when the carriage has moved to the intermediate position. This is also true in other embodiments of the invention. For example, in an implementation of the FIG. 4 embodiment which includes means for releasibly latching carriage 8 in an intermediate position, carriage 8 will typically be the position of carriage 8' (shown in phantom view in FIG. 4), which is only a short distance above the fully lowered position of carriage 8. When the latch (not shown in FIG. 4) retains carriage 8 in the intermediate position, member 31 engages arms 48B and 49B and retains them in substantially the position shown in FIG. 4, and thus spring 44 remains bent (substantially as shown in FIG. 4) when carriage 8 is in the intermediate position. Due to its bent configuration, spring 44 exerts a force on cover plates 14 and 15 which retains cover plates 14 and 15 in their closed position (shown in FIG. 4) when carriage 8 is in the intermediate position. Thus, the invention slows the cooling of a toasted item on carriage 8 (after toasting), retaining the crispiness of the toasted item for a longer time, since the entire toasted item remains near heating elements 12 when the carriage is in the intermediate position (elements 12 will themselves cool slowly, after they have been disconnected from the power supply before carriage 8 enters the intermediate position) and since cover plates 14 and 15 remain closed thereby causing hot air to recirculate within the toasting volume even when carriage 8 is in the intermediate position. This has the benefit of keeping the toasted item warm and crisp until the user is ready to remove it from the toaster.

When the user wishes to remove the toasted item from a toaster whose carriage is in the intermediate position, he or she manually actuates a release control (e.g., presses a control such as button 26A on the outside of the toaster), to release the latch which holds carriage 8 in the intermediate position, thus triggering the following actions: release of carriage 8 so that it is free to be pulled up by spring 29 to its fully raised position; and release of the carriage assembly component (e.g., member 31) which had held arms 48B and 49B in a position keeping the inventive cover closed, making spring 44 free to relax and thereby open the inventive cover (i.e., separate assembly 2 from assembly 7 and cover plate 14 from cover plate 15).

A suitable mechanical latch for latching the bread carriage of other embodiments of the invention in an intermediate position (after deactivation of a solenoid which had held the carriage in the fully lowered position) and a manually-actuatable release control for releasing the mechanical latch thereby allowing a spring to pull up the carriage to its fully raised position, are described in above-referenced British Patent Application Publication No. 2,285,389A.

In all variations of the embodiments of FIGS. 1–6 and 7–8, the electric power supplied to the toaster's heating elements (e.g., heating elements 12) should be limited so that the temperature within each toasting volume, and the temperature at the toaster components surrounding the toasting volume (e.g., at closed plates 14 and 15), during a toasting operation does not increase to a level that would cause the object being toasted or components of the toaster (e.g., the closed cover plates) to burn or melt. The material comprising the inventive toaster cover (e.g., the material comprising slidable plates 14–15, or rotatable plates 80–83 to be described below) should be chosen to retain a desired amount of heat within the toasting volume. The toaster cover is made of metal in preferred embodiments, but it can be made of non-metallic, thermally insulating material in other embodiments. The material comprising the inventive toaster cover should be chosen so that it does not melt or burn during toasting.

We next describe another embodiment of the inventive toaster with reference to FIGS. 9–12. In this embodiment, the toaster has two slots (toasting volumes). A cover designed in accordance with the invention is provided to cover each slot. Each cover comprises a pair of rotatably mounted plates (pair of plates 80 and 81 or pair of plates 82 and 83). Each plate is preferably made of metal.

The toaster frame includes vertical side plates 111, end plates 112 and 112' (each fixedly attached to end plates 111), horizontal top insulation member 113 connected between plates 111, and end member 130 fixedly attached to end plate 112. Two rivets 114 protrude from plate 112, and two identical rivets 114 protrude from plate 112'. Two slots 20, which define tracks along which bread carriage 108 moves, extend through each of plates 112 and 112'. Two rivets 99 protrude from plate 112, a lever 101 is mounted to one of rivets 99, and a lever 102 is mounted to the other of rivets 99. Similarly, two rivets 99 (not shown) protrude from plate 112', a lever 101 (not shown) is mounted to one of these rivets 99, and a lever 102 (not shown) is mounted to the other of rivets 99.

Enclosure 110 (not shown in FIGS. 11 and 12) surrounds the frame. The frame and cover plates 80, 81, 82, and 83 are preferably made of plated steel. Enclosure 110 is preferably made of plated or painted steel, or (to make the toaster cool to the touch during operation) high temperature thermal plastic such as polypropylene or polycarbonate.

Carriage 108 (shown in phantom view in FIGS. 9 and 10) is sized and shaped to support two slices of bread (one in each toasting volume), and is mounted within the frame with freedom to move relative to the frame along slots 20. One end of carriage 108 (the end that rides in slots 20 in plate 112) is rigidly connected to a handle assembly (which includes member 131), and the handle assembly is slidably mounted to end member 130. In response to force exerted on the handle assembly (typically by the hand of a human user), carriage 108 is lowered relative to the frame from the raised position shown in FIG. 9 to the lowered position shown in FIG. 10. Carriage 108 is biased by an extension spring (not shown, but which is preferably identical to spring 29 of the embodiment of FIGS. 5 and 6) to be normally in the raised position. The action of manually lowering carriage 108 to the lowered position thus overcomes the biasing force exerted by the spring. A means for releasibly locking carriage 108 in the lowered position (and/or in an intermediate position after release from the lowered position) is provided. This means is preferably identical to the means (described above with reference to FIGS. 1–6 or FIGS. 7–8) for performing the corresponding functions in the embodiment of FIGS. 1–6 or FIGS. 7–8, and the description thereof will not be repeated with reference to FIGS. 9–12.

Figure 9:
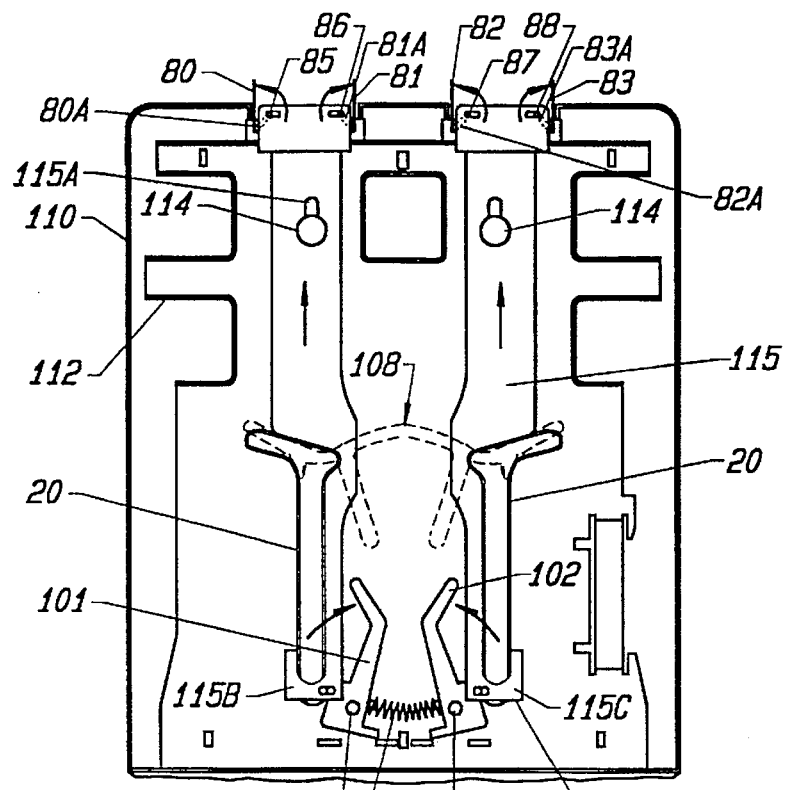
FIG. 9 is a cross-sectional view (in a first plane) of a second preferred embodiment of the inventive toaster with its bread carriage in a raised position.
Figure 10:
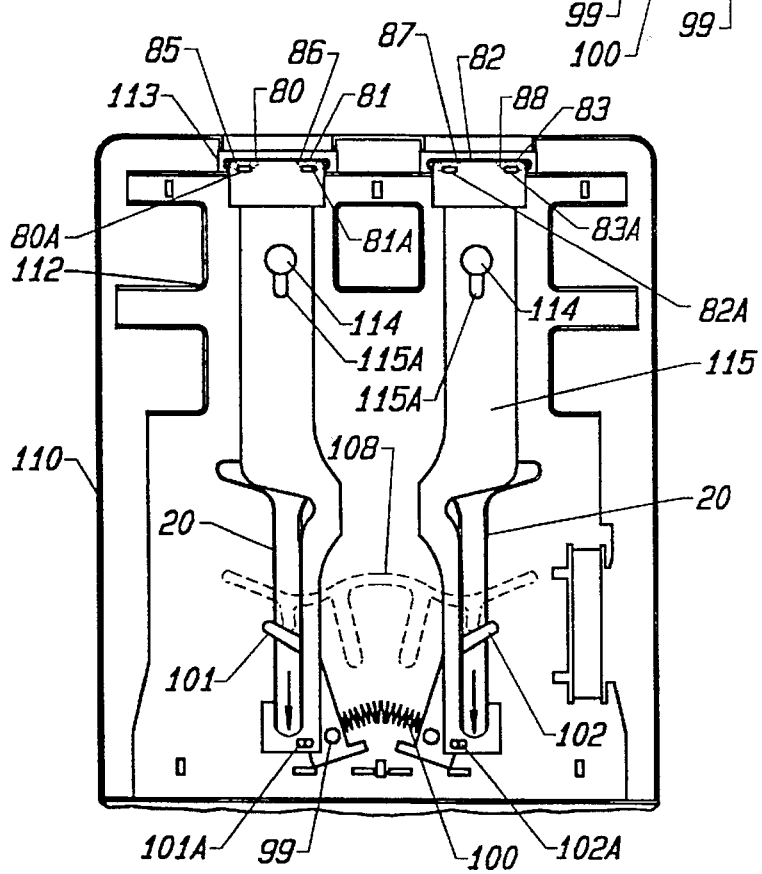
FIG. 10 is a cross-sectional view (in the first plane) of the second preferred embodiment of the inventive toaster, with its bread carriage in a lowered position.

The toaster of FIGS. 9–12 also includes two plates 115, each slidably mounted to one of end plates 112 and 112' with freedom to move between a raised position shown in FIG. 9 (in which the lower ends of slots 115A through plate 115 are stopped by rivets 114) and the lowered position shown in FIG. 10 (in which the upper ends of slots 115A are stopped by rivets 114).

Each of levers 101 and 102 is mounted to a rivet 99 protruding from plate 112, with freedom to pivot with respect to the rivet 99. Spring 100 is attached between levers 101 and 102. Spring 100 exerts a biasing force on levers 101 and 102 tending to separate the levers and thus to maintain the levers in the FIG. 9 orientation. Pin 101A protruding from lever 101 is attached to bottom left portion 115B of plate 115, with lever 101 free to pivot relative to portion 115B when plate 115 slides relative to plate 112. Pin 102A protruding from lever 102 is attached to bottom right portion 115C of plate 115, with lever 102 free to pivot relative to portion 115C when plate 115 slides relative to plate 112.

When carriage 108 is manually lowered from the FIG. 9 position to the FIG. 10 position, carriage 108 engages levers 101 and 102 and rotates levers 101 and 102 (about rivets 99) from their positions shown in FIG. 9 to their positions shown in FIG. 10. Rotating levers 101 and 102 overcome the biasing force exerted thereon by spring 100, thus displacing spring 100 into the position shown in FIG. 10. Also when levers 101 and 102 rotate into their FIG. 10 position, pins 101A and 102A pull plate 115 down to its lowered position shown in FIG. 10 (until rivets 114 stop further downward motion of plate 115 relative to plate 112).

This downward motion of plate 115 causes cover plates 80, 81, 82, and 83 to rotate into their closed positions (shown in FIGS. 10 and 11) in which plates 80 and 81 cover the toasting volume on the toaster's left side and plates 82 and 83 cover the toasting volume on the toaster's right side. The manner in which this is accomplished will be described with reference to FIG. 10A, which is an enlarged view of a portion of the FIG. 10 apparatus.

Figure 10A:
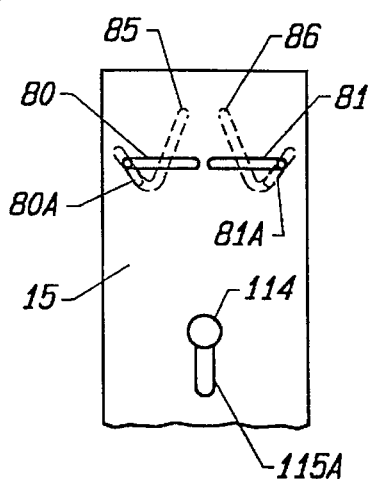
FIG. 10A is an enlarged detail of a portion of the apparatus of FIG. 10.
Figure 11:
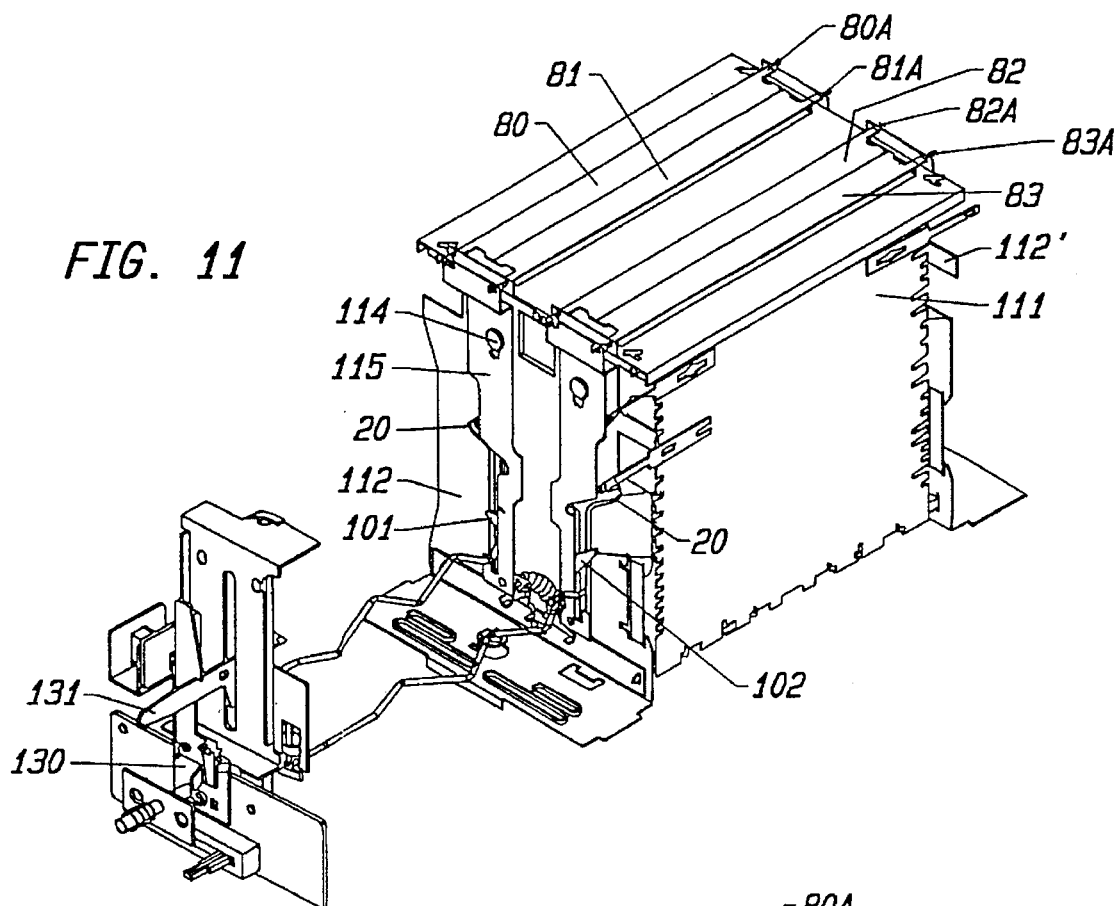
FIG. 11 is an exploded perspective view of the toaster of FIGS. 9–10 (with enclosure 110 removed), with the bread carriage in the lowered position.
Figure 12:
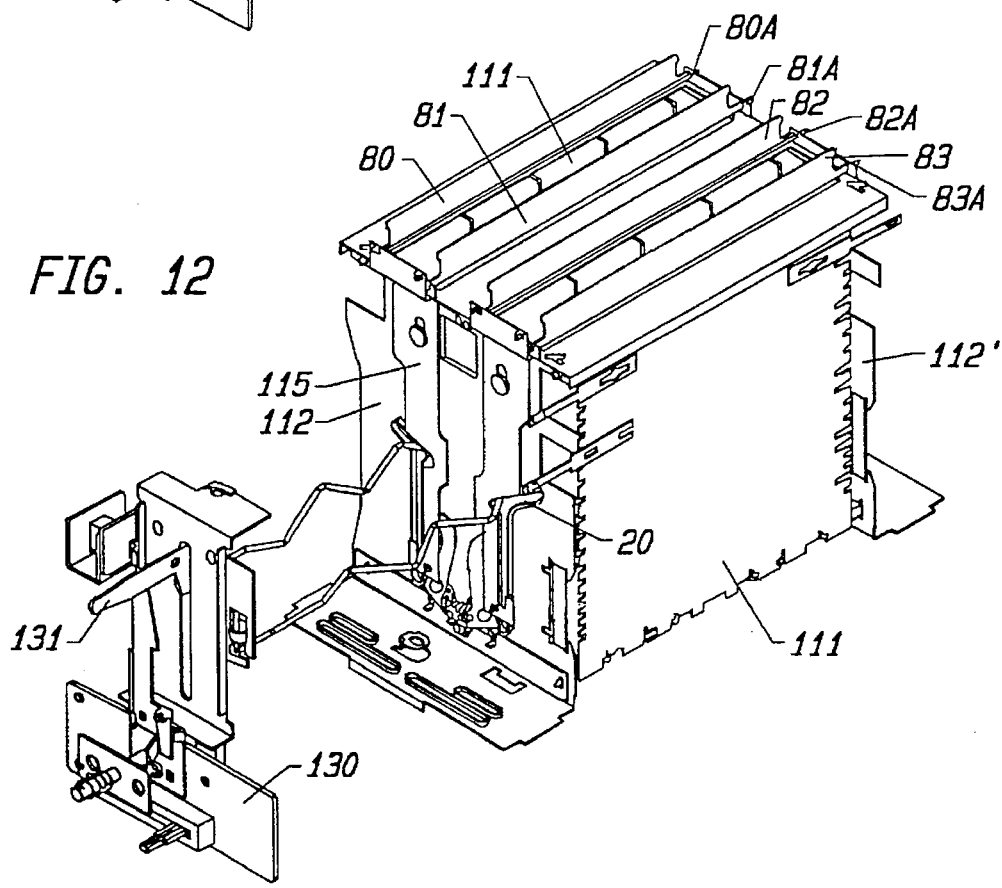
FIG. 12 is an exploded perspective view of the toaster of FIGS. 9–10 (with enclosure 110 removed), with the bread carriage in the raised position.

Plate 80 consists of a flat central plate portion, and flat rod portion 80A protruding from each end of the central portion. The flat surface of each rod portion 80A is oriented at an acute angle relative to the central portion (as best shown in FIG. 10A). Each of plates 81, 82, and 83 also consists of a flat central plate portion with a flat rod portion (81A, 82A, and 83A, respectively) protruding from each end of the central portion. End portions 80A, 81A, 82A, and 83A are rotatably mounted to the toaster frame (so that plates 80–83 are free to rotate but not translate relative to the toaster frame).

Each plate 115 has four curved slots (85, 86, 87, and 88) extending therethrough. As best shown in FIG. 10A, slot 85 provides a track along which rod portion 80A of cover plate 80 "rides" (slot 87, identical to slot 85, provides a track along which rod portion 82A of plate 82 rides) when plate 115 translates up or down relative to the toaster frame, and slot 86 provides a track along which rod portion 81A of cover plate 81 rides (slot 88, identical to slot 86, provides a track along which rod portion 83A of plate 83 rides) when plate 115 translates up or down relative to the toaster frame. When levers 101 and 102 pull down plates 115 into the position shown in FIG. 10 (and FIG. 10A), the downward-moving plates 115 rotate cover plates 80, 81, 82, and 83 until the cover plates reach their closed positions shown in FIG. 10 and FIG. 10A (by the action of slots 85, 86, 87, and 88, on rod portions 80A, 81A, 82A, and 83A, respectively, as the rod portions ride along the slots to the outer ends of the slots).

When carriage 108 is released (so that its bias spring pulls it up to the FIG. 9 position, spring 100 relaxes to its FIG. 9 position, thereby returning levers 101 and 102 to their FIG. 9 position. As levers 101 and 102 return to their FIG. 9 position, pins 101A and 102A push plates 115 up to their raised position. The upward-moving plates 115 rotate cover plates 80, 81, 82, and 83 until the cover plates reach their opened positions shown in FIG. 9 (by the action of slots 85, 86, 87, and 88, on rod portions 80A, 81A, 82A, and 83A, respectively, as the rod portions ride along the slots to the inner ends of the slots). With the covers opened, toasted bread can be removed from the bread carriage.

In variations on the embodiment of FIGS. 9–12, when the bread carriage is manually lowered by the user, other mechanical linkages attached to the carriage rotate a pair of cover plates so that they cover a toasting volume. Then, when the carriage springs up (after a toasting operation), the mechanical linkages rotate the plates in the opposite directions to uncover the toasting volume and allow removal of the toasted object.

Various other modifications and alterations in the apparatus of the invention will be apparent to those skilled in the art. Although the invention has been described in connection with specific preferred embodiments, it should be understood that the invention as claimed should not be unduly limited to such specific embodiments.

What is claimed is:

1. A toaster, including:

a frame enclosing a toasting volume, wherein the frame defines an opening for admitting an object into the toasting volume;

a carriage assembly;

a member rigidly attached to the carriage assembly, wherein the member is translatably engaged with the frame so that the carriage assembly is movable relative to the frame between a raised position and a lowered position in the toasting volume in response to translation of the member relative to the frame;

a mechanical link assembly having a first configuration and a second configuration, wherein the mechanical link assembly enters the first configuration in response to the carriage assembly moving to the lowered position and engaging a portion of said mechanical link assembly, and wherein the mechanical link assembly enters the second configuration in response to the carriage assembly moving to the raised position; and a cover attached to the mechanical link assembly, wherein the mechanical link assembly holds the cover in a first position at least partially covering the opening when the mechanical link assembly is in the first configuration, and wherein the mechanical link assembly holds the cover in a second position uncovering the opening when the mechanical link assembly is in the second configuration, wherein the cover includes a first plate slidably mounted to the frame and a second plate slidably mounted to the frame, and wherein the mechanical link assembly includes:

means for sliding the first plate and the second plate into positions at least partially covering the opening in response to movement of the carriage assembly into the lowered position.

2. The toaster of claim 1, also including:

heating elements; and power supply means for supplying power to the heating elements in response to entry of the mechanical link assembly into the first configuration, and for decoupling the power from the heating elements in response to a timer signal generated on termination of a toasting period after entry of the mechanical link assembly into the first configuration, wherein the carriage assembly enters the raised position automatically thereby causing the mechanical link assembly to enter the second configuration in response to assertion of the timer signal.

3. The toaster of claim 1, also including:

heating elements;

power supply means for supplying power to the heating elements in response to entry of the mechanical link assembly into the first configuration, and for decoupling the power from the heating elements in response to a timer signal generated upon termination of a toasting period after entry of the mechanical link assembly into the first configuration;

carriage biasing means for urging the carriage assembly to the raised position;

latch means for releasibly holding the carriage assembly in the lowered position in response to the carriage assembly moving to said lowered position;

latch release means for releasing said latch means in response to an external force applied after assertion of the timer signal, thereby allowing the carriage biasing means to move the carriage assembly to the raised position.

4. The toaster of claim 1, wherein the cover substantially totally covers the opening when the mechanical link assembly is in the first configuration.

5. The toaster of claim 1, wherein the frame also encloses a second toasting volume and the frame also defines a second opening for admitting a second object into the second toasting volume, and wherein the toaster also includes:

a second mechanical link assembly having a first member attached to the carriage assembly, wherein the second mechanical link assembly enters a first configuration in response to the carriage assembly moving to the lowered position, and wherein the second mechanical link assembly enters a second configuration in response to the carriage assembly moving to the raised position; and a second cover attached to the second mechanical link assembly, wherein the second mechanical link assembly holds the second cover in a first position at least partially covering the second opening when the mechanical link assembly is in the first configuration, and wherein the second mechanical link assembly holds the second cover in a second position uncovering the second opening when the second mechanical link assembly is in the second configuration.

6. The toaster of claim 1, wherein the means for sliding the first plate and the second plate includes:

a first subassembly movably mounted to the frame, and having a top end connected to the first plate and a bottom end positioned for engagement by the carriage assembly when said carriage assembly moves into the lowered position, wherein the first subassembly moves the first plate into a position at least partially covering the opening in response to the carriage assembly engaging the bottom end of the first subassembly when said carriage assembly moves into the lowered position; and a second subassembly movably mounted to the frame and having a top end connected to the second plate and a bottom end positioned for engagement by the carriage assembly when said carriage assembly moves into the lowered position, wherein the second subassembly moves the second plate into a position at least partially covering the opening in response to the carriage assembly engaging the bottom end of the second subassembly when said carriage assembly moves into the lowered position.

7. The toaster of claim 6, wherein the first subassembly includes:

a hinge means rotatably mounted to the frame;

a first lever arm having one end attached to the hinge means;

a second lever arm having one end attached to the hinge means and whose opposite end is said bottom end of the first subassembly; and a wire assembly rigidly attached to the first lever arm and having an upper portion which is said top end of the first subassembly.

8. The toaster of claim 7, wherein the second subassembly includes:

a second hinge means rotatably mounted to the frame;

a third lever arm having one end attached to the hinge means a fourth lever arm having one end attached to the second hinge means and whose opposite end is said bottom end of the second subassembly; and a second wire assembly rigidly attached to the third lever arm and having an upper portion which is said top end of the first subassembly, and wherein the means for sliding the first plate and the second plate also includes:

spring means attached between the wire assembly and the second wire assembly, for exerting a biasing force urging said wire assembly away from said second wire assembly and thus the first plate away from the second plate, wherein said wire assembly and said second wire assembly overcome said biasing force and move together in response to movement of the carriage assembly into the lowered position.

9. A toaster, including:

a frame enclosing a toasting volume, wherein the frame defines an opening for admitting an object into the toasting volume;

a carriage assembly;

a member rigidly attached to the carriage assembly, wherein the member is translatably engaged with the frame so that the carriage assembly is movable relative to the frame between a raised position and a lowered position in the toasting volume in response to translation of the member relative to the frame;

a mechanical link assembly having a first configuration and a second configuration, wherein the mechanical link assembly enters the first configuration in response to the carriage assembly moving to the lowered position and engaging a portion of said mechanical link assembly, and wherein the mechanical link assembly enters the second configuration in response to the carriage assembly moving to the raised position; and a cover attached to the mechanical link assembly, wherein the mechanical link assembly holds the cover in a first position at least partially covering the opening when the mechanical link assembly is in the first configuration, and wherein the mechanical link assembly holds the cover in a second position uncovering the opening when the mechanical link assembly is in the second configuration, wherein the cover includes a first plate rotatably mounted to the frame and a second plate rotatably mounted to the frame, and wherein the mechanical link assembly includes:

means for rotating the first plate and the second plate into positions at least partially covering the opening in response to movement of the carriage assembly into the lowered position, wherein the means for rotating the first plate and the second plate includes:

a sliding plate slidably mounted to the frame, wherein there is a first slot and a second slot in said sliding plate, the first plate has an end portion which extends through the first slot, and the second plate has an end portion which extends through in the second slot.

10. The toaster of claim 9, wherein the end portion of the first plate is rotatably mounted to the frame, the end portion of the second plate is rotatably mounted to the frame, wherein the sliding plate translates in response to movement of the carriage assembly into the lowered position thereby causing the first slot to rotate the end portion of the first plate in a first rotational direction as said end portion of the first plate rides in the first slot during said translation, and causing the second slot to rotate the end portion of the second plate in a second rotational direction as said end portion of the second plate rides in the second slot during said translation.

11. A toaster, including:

a frame enclosing a toasting volume, wherein the frame defines an opening for admitting an object into the toasting volume;

a carriage assembly;

a member rigidly attached to the carriage assembly, wherein the member is translatably engaged with the frame so that the carriage assembly is movable relative to the frame between a raised position and a lowered position in the toasting volume in response to translation of the member relative to the frame;

a pair of cover plates movably mounted to the frame; and means for moving the cover plates into a first configuration at least partially covering the opening in response to movement of the carriage assembly into the lowered position, and for moving the cover plates into a second configuration uncovering the opening in response to movement of the carriage assembly into the raised position, wherein the cover plates are slidably mounted to the frame, and wherein the means for moving the cover plates is a mechanical link assembly including:

means for sliding the cover plates into the first configuration in response to movement of the carriage assembly into the lowered position.

12. The toaster of claim 11, wherein the cover plates substantially totally cover the opening when in said first configuration.

13. The toaster of claim 11, wherein the cover plates include a first plate and a second plate, and wherein the means for sliding the cover plates includes:

a first subassembly movably mounted to the frame, and having a top end connected to the first plate and a bottom end positioned for engagement by the carriage assembly when said carriage assembly moves into the lowered position, wherein the first subassembly moves the first plate into a position at least partially covering the opening in response to the carriage assembly engaging the bottom end of the first subassembly when said carriage assembly moves into the lowered position; and a second subassembly movably mounted to the frame and having a top end connected to the second plate and a bottom end positioned for engagement by the carriage assembly when said carriage assembly moves into the lowered position, wherein the second subassembly moves the second plate into a position at least partially covering the opening in response to the carriage assembly engaging the bottom end of the second subassembly when said carriage assembly moves into the lowered position, wherein the first subassembly includes:

a hinge means rotatably mounted to the frame;

a first lever arm having one end attached to the hinge means;

a second lever arm having one end attached to the hinge means and whose opposite end is said bottom end of the first subassembly; and a wire assembly rigidly attached to the first lever arm and having an upper portion which is said top end of the first subassembly.

14. A toaster, including:

a frame enclosing a toasting volume, wherein the frame defines an opening for admitting an object into the toasting volume;

a carriage assembly;

a member rigidly attached to the carriage assembly, wherein the member is translatably engaged with the frame so that the carriage assembly is movable relative to the frame between a raised position and a lowered position in the toasting volume in response to translation of the member relative to the frame;

a pair of cover plates movably mounted to the frame; and means for moving the cover plates into a first configuration at least partially covering the opening in response to movement of the carriage assembly into the lowered position, and for moving the cover plates into a second configuration uncovering the opening in response to movement of the carriage assembly into the raised position, wherein the cover plates are rotatably mounted to the frame, and wherein the means for moving the cover plates is a mechanical link assembly including:

means for rotating the cover plates into the first configuration in response to movement of the carriage assembly into the lowered position, wherein the cover plates include a first plate and a second plate, and wherein the means for rotating the cover plates includes:

a sliding plate slidably mounted to the frame, wherein there is a first slot and a second slot in said sliding plate, the first plate has an end portion which extends through the first slot, and the second plate has an end portion which extends through in the second slot.

* * * * *